United States Patent
Tang et al.

(10) Patent No.: US 10,486,435 B2
(45) Date of Patent: Nov. 26, 2019

(54) PRINTING APPARATUS, PRINTING METHOD, AND COMPUTER STORAGE MEDIUM

(71) Applicant: Lenovo (Beijing) Co., Ltd., Beijing (CN)

(72) Inventors: Bojiong Tang, Beijing (CN); Zhiguo Fan, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/941,214

(22) Filed: Mar. 30, 2018

(65) Prior Publication Data

US 2019/0001704 A1 Jan. 3, 2019

(30) Foreign Application Priority Data

Jun. 30, 2017 (CN) .......................... 2017 1 0522992

(51) Int. Cl.
*B41J 2/47* (2006.01)
*G02B 26/10* (2006.01)
*B41J 2/44* (2006.01)
*G02B 3/06* (2006.01)
*B41J 2/43* (2006.01)

(52) U.S. Cl.
CPC .............. *B41J 2/471* (2013.01); *G02B 26/10* (2013.01); *B41J 2/43* (2013.01); *B41J 2/442* (2013.01); *G02B 3/06* (2013.01)

(58) Field of Classification Search
CPC ... B41J 2/471; B41J 2/442; B41J 2/43; G02B 3/06; G02B 26/10
See application file for complete search history.

(56) References Cited

U.S. PATENT DOCUMENTS

| 4,750,045 | A | | 6/1988 | Ohara et al. | |
|---|---|---|---|---|---|
| 4,932,732 | A | * | 6/1990 | Nakajima | ................ B41J 2/471 359/210.1 |
| 5,467,121 | A | * | 11/1995 | Allcock | ................... B41J 2/471 347/260 |
| 2008/0239060 | A1 | * | 10/2008 | Jo | ........................... B41J 2/471 347/259 |

FOREIGN PATENT DOCUMENTS

| CN | 101131438 A | 2/2008 |
|---|---|---|
| CN | 101276055 A | 10/2008 |
| CN | 102902175 A | 1/2013 |
| CN | 103376550 A | 10/2013 |

* cited by examiner

*Primary Examiner* — Yaovi M Ameh
(74) *Attorney, Agent, or Firm* — Anova Law Group, PLLC

(57) ABSTRACT

The present disclosure provides a printing apparatus. The printing apparatus includes a light-emitting device, a reflector, and a light-sensing device. The light-emitting device emits printing light. The reflector is at least partially located in an irradiation region of the printing light, and has a surface reflecting the printing light at different positions to generate reflected light having different exit directions. The light-sensing device includes a light-sensing surface. The light-sensing surface is at least partially located in an irradiation region of the reflected light and senses the reflected light to generate a plurality of continuously-distributed light spots on the light-sensing surface with any adjacent light spots equally spaced apart.

16 Claims, 4 Drawing Sheets

PRINTING APPARATUS, PRINTING METHOD, AND COMPUTER STORAGE MEDIUM

CROSS-REFERENCES TO RELATED APPLICATIONS

This application claims priority of Chinese Patent Application No. 201710522992.8, filed on Jun. 30, 2017, the entire contents of which are hereby incorporated by reference.

FIELD OF THE DISCLOSURE

The present disclosure generally relates to the field of electronic technology and, more particularly, relates to a printing apparatus, a laser printing method, and a computer storage medium.

BACKGROUND

A laser printing apparatus is a device that can print using laser beams in a scanning manner. A laser printing apparatus usually includes a laser controller, a laser-emitting device, a polygon prism, a lens, and a laser-sensing device. The laser controller is connected to the laser-emitting device for controlling the laser-emitting device to emit laser according to the print content. The laser-emitting device, connected to the laser controller, emits laser according to the control instructions of the laser controller. The polygon prism receives the laser emitted by the laser-emitting device, and transmits the laser onto the lens through light reflection. That is, the polygon prism serves as a reflector. The lens, under the irradiation of the laser transmitted by the reflector, uniformly distributes the laser beams to the laser-sensing device.

Although the existing laser printing apparatuses may demonstrate some advantages such as fast printing speed and desired printing quality, the structures of the laser printing apparatuses are relatively complicated, and the laser printing apparatus cost more than the ordinary non-laser printing apparatuses. The disclosed printing apparatus, printing method, and computer storage medium are directed to solve one or more problems set forth above and other problems.

BRIEF SUMMARY OF THE DISCLOSURE

One aspect of the present disclosure provides an apparatus. The apparatus includes a light-emitting device, a reflector, and a light-sensing device. The light-emitting device emits printing light. The reflector is at least partially located in an irradiation region of the printing light, and has a surface reflecting the printing light at different positions to generate reflected light having different exit directions. The light-sensing device includes a light-sensing surface. The light-sensing surface is at least partially located in an irradiation region of the reflected light and senses the reflected light to generate a plurality of continuously-distributed light spots on the light-sensing surface with any adjacent light spots equally spaced apart.

Another aspect of the present disclosure provides a method. The method includes emitting printing light by a light-emitting device of a printing apparatus, and reflecting the printing light at different positions of a surface of a reflector of the printing apparatus to generate reflected light having different exit directions. The reflector is at least partially located in an irradiation region of the printing light. The printing method further includes sensing the reflected light by a light-sensing surface of a light-sensing device of the printing apparatus to generate a plurality of continuously-distributed light spots on the light-sensing surface with any adjacent light spots equally spaced apart. The light-sensing device is at least partially located in the irradiation region of the reflected light.

Another aspect of the present disclosure provides a computer storage medium. The computer storage medium stores a computer program. Executing the computer program causes a processor to perform a printing method. The printing method includes emitting printing light by a light-emitting device of a printing apparatus, and reflecting the printing light at different positions of a surface of a reflector of the printing apparatus to generate reflected light having different exit directions. The reflector is at least partially located in an irradiation region of the printing light. The printing method further includes sensing the reflected light by a light-sensing surface of a light-sensing device of the printing apparatus to generate a plurality of continuously-distributed light spots on the light-sensing surface with any adjacent light spots equally spaced apart. The light-sensing device is at least partially located in the irradiation region of the reflected light.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to various embodiments of the disclosure, which are illustrated in the accompanying drawings. It should be understood that the descriptions in the present disclosure are merely illustrative, and are not intended to limit the scope of the present disclosure.

Figure 1:
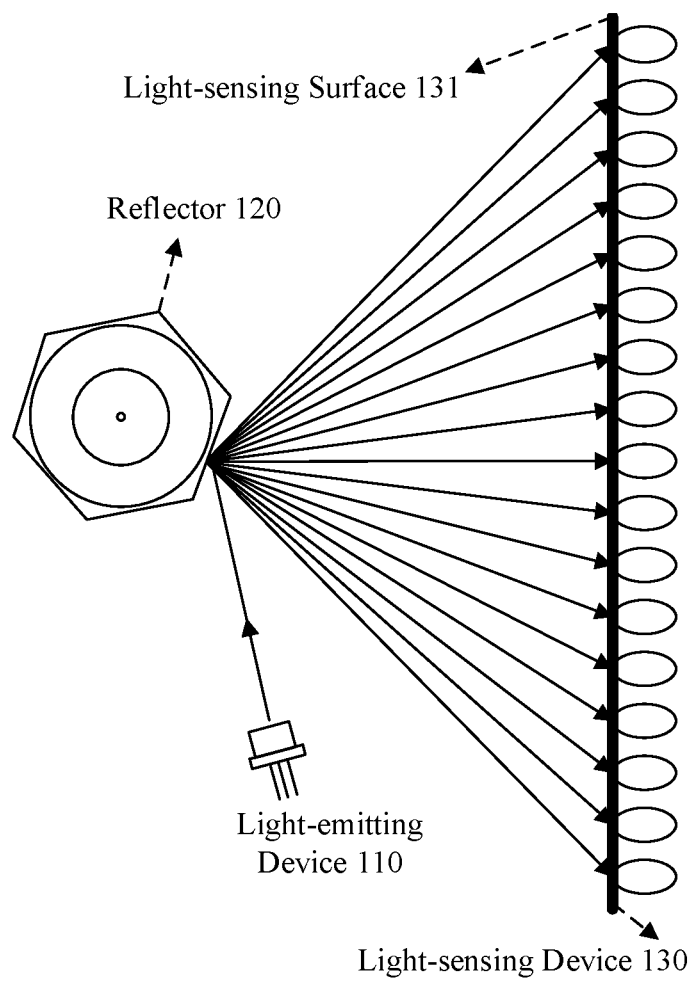
FIG. 1 illustrates a schematic structural view of a printing apparatus consistent with some embodiments of the present disclosure.

FIG. 1 illustrates a schematic structural view of a printing apparatus consistent with some embodiments of the present disclosure. Referring to FIG. 1, the printing apparatus includes: a light-emitting device 110 for emitting printing light; a reflector 120, at least partially located in the irradiation region of the printing light, and reflecting the printing light at different positions to generate reflected light beams having different exit directions; a light-sensing device 130, including a light-sensing surface 131 for light sensing. The light-sensing surface 131 may be at least partially located in the irradiation region of the reflected light for directly sensing the reflected light. The distance between any two adjacent light spots of the plurality of continuously-distributed light spots formed on the light-sensing surface 131 by the reflected light may be the same.

The present disclosure provides a printing apparatus. In some embodiments, the printing apparatus may be a laser printing apparatus. That is, when the printing apparatus is printing, the printing light emitted in the printing apparatus may be laser beams.

In some embodiments, the light-emitting device 110 may include one or more emitters for emitting the printing light. When the printing apparatus is a laser printing apparatus, the light-emitting device 110 may include one or more light-emitting diodes for emitting laser beams.

In some embodiments, the printing apparatus may also include a controller. The controller may control the light emission of the light-emitting device 110 according to the image to be printed.

The controller may control the light-emitting device 110 on and off according to a printing time sequence (i.e., a light-emitting time sequence). When the light-emitting device 110 is on, the printing light may be emitted, and when the light-emitting device 110 is off, the printing light may not be emitted.

In some embodiments, the light-emitting device 110 is a linear light-emitting device, that is, the light-emitting device 110 is able to print one or more pixel rows at a time. After the printing apparatus finishes the printing of one or more pixel rows and moves to print other pixel rows, the light-emitting device 110 may enter an off state controlled by the controller. Further, according to the print content of other pixel rows, the linear light-emitting device may be controlled to emit printing light on corresponding pixels.

In other embodiments, the light-emitting device 110 is a point light-emitting device, which can emit light for printing a single pixel at a time. After the printing apparatus finishes printing each pixel, the light-emitting device 110 may be turned off by the controller. Further, when the next pixel does not require light emission according to the print content, the off state may be retained; and when next pixel requires light emission, the light-emitting device 110 may be turned on during the time period for printing the next pixel.

The reflector 120 may include various mirrors capable of reflecting light. At any time, by determining the relative positions of the light-emitting device 110 and the reflector 120, and controlling the direction of the printing light reflected by the reflector 120, the reflector 120 may have at least a portion in the irradiation region of the printing light. That is, the reflector 120 may be at least partially located in the irradiation region of the printing light. As such, the printing light may be irradiated onto the reflector 120, and thus the reflector 120 may change the transmission direction of the light incident on the mirror surface of the reflector 120 based on the reflection principle of light transmission, and further reflect the light incident on the mirror surface of the reflector 120 to the light-sensing surface 131 of the light-sensing device 130.

The light-sensing surface 131 may be a light-sensitive surface. For example, the light-sensing device 130 may be a toner cartridge, and the light-sensing surface 131 may be the surface of the toner cartridge. The portion of the light-sensing surface 131 exposed in light may undergo physical or chemical changes. Therefore, the light-emitting device 110 may control whether the printing light is emitted or not according to the content to be printed, such that some positions on the light-sensing surface 131 may be able to sense the reflected light generated from the reflection of the printing light, while some other positions may not be able to sense the reflected light. By further combining the change of the light-sensing surface 131 under irradiation, an inductive pattern consistent with the content to be printed may be generated on the light-sensing surface 131 for further printing.

For example, the printing apparatus is a laser printing apparatus, and electric charges are evenly distributed on the light-sensing surface 131 before laser beams are sensed by the light-sensing surface 131. After the laser is irradiated onto the light-sensing surface 131, under the irradiation of the laser, the electric charges on the light-sensing surface 131 may be neutralized at the positions that receive/sense the laser. However, the electric charges may still remain on the light-sensing surface 131 at the positions that do not receive/sense the laser. During the subsequent printing process, the positions on the light-sensing surface 131 with electric charges remained may be able to adsorb the printing ink. The printing ink may be carbon powder, or any other appropriate material for printing. After absorbing the printing ink, when the light-sensing surface 131 contacts with the printing paper, the positions with absorbed printing ink may leave a printing mark on the printing paper, while the other positions (i.e., the positions of light-sensing surface 131 that are irradiated by laser in the printing cycle) may leave the corresponding regions on the printing paper blank. As such, printing the corresponding pixels on the paper may be completed. Therefore, by controlling whether the laser is emitted or not according to the content to be printed, an inductive pattern consistent with the content to be printed may be formed on the light-sensing surface 131, and through subsequent operations, printing the corresponding content may then be completed.

In some embodiments, after the printing light is irradiated onto the reflector 120, the printing light may be directly reflected onto the light-sensing surface 131 by the reflector 120 through a transmission medium such as air, etc. The printing light may not be processed by other lenses or other intermediate equipment in the transmission path from the reflector 120 to the light-sensing surface 131. Moreover, in some cases that the reflected light incident onto the light-sensing surface 131 forms a plurality of continuously distributed light spots, the plurality of continuously-distributed light spots may be equally spaced. In some embodiments, the entire light-sensing surface 131 may be able to receive the reflected light, and the light spots formed on the light-sensing surface 131 by the reflected light may be distributed uniformly. For example, when the printing light needs to act on a row on the surface of the light-sensing device 130 as shown in FIG. 1, the light spots received by the row may be distributed uniformly. That is, the distance between any two adjacent light spots may be the same. For example, for any two adjacent pixels, the distance between two corresponding light spots sensed by the light-sensing surface 131 may be identical.

According to the disclosed printing apparatus, during the transmission of the printing light toward the light-sensing device 130, the reflected light may be able to uniformly distribute the light spots corresponding to any two adjacent pixels onto the light-sensing surface 131 without being refracted by any lens or other components, and may thus lead to uniform printing. Therefore, the disclosed printing apparatus may eliminate some special refraction components, e.g. lenses, and thus reduce the types and the number of the components included in the printing apparatus. Therefore, the structure of the printing apparatus may be simplified, the printing apparatus may become thinner and lighter, and the cost of the printing apparatus may also be reduced. Moreover, according to the disclosed printing apparatus, even when the light-sensing surface 131 directly senses the printing light, the light spots corresponding to any two adjacent pixels may still be evenly distributed (i.e., equally spaced) to ensure the printing quality.

Figure 2:
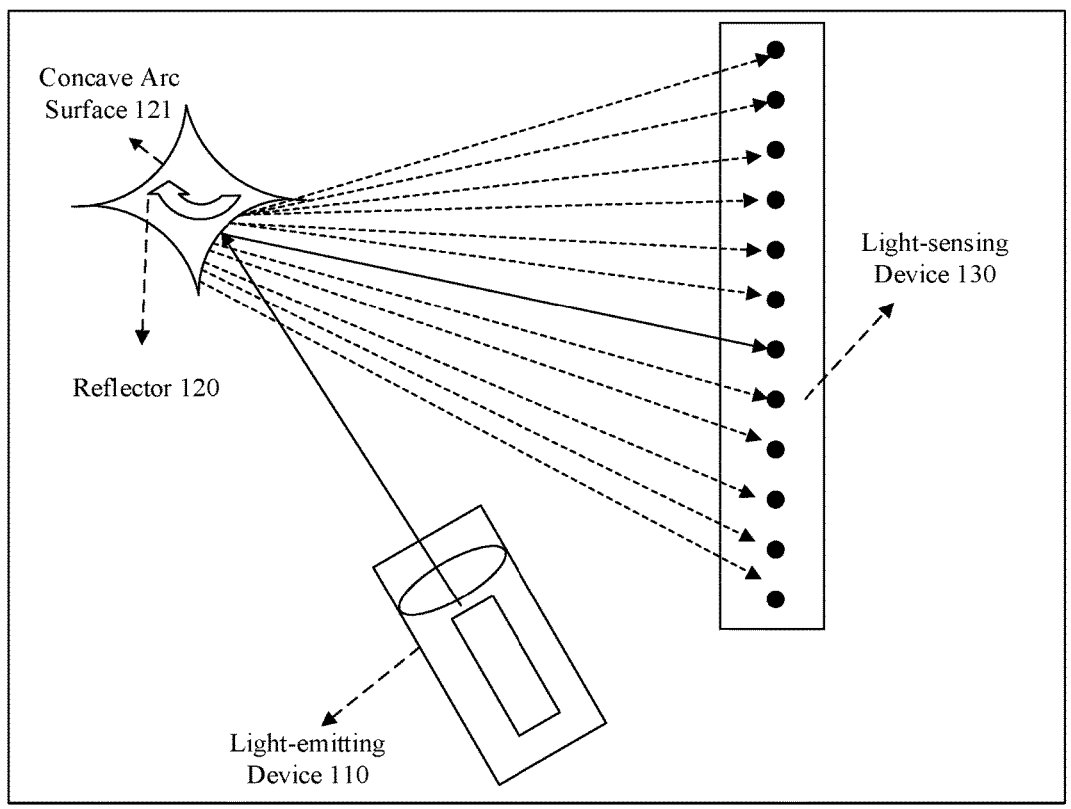
FIG. 2 illustrates a schematic structural view of another printing apparatus consistent with some embodiments of the present disclosure.

FIG. 2 illustrates a schematic structural view of another printing apparatus consistent with some embodiments of the present disclosure. Referring to FIG. 2, a reflector 120 provided in some embodiments may include an arc-surface reflector. The arc-surface reflector may include one or more concave arc surfaces 121. The concave arc surfaces 121 may use different positions to reflect the printing light to different positions of the light-sensing surface 131.

In some embodiments, the concave arc surface 121 may be formed to be concave toward the center of the reflector instead of being convex toward the outside. Therefore, the arc surface may be a concave arc surface. Different positions of the concave arc surface 121 may provide different incident printing light beams, and the printing light may be reflected onto the light-sensing surface of the light-sensing device 130 based on the principle of light reflection.

For implementation, the reflector 120 may have at least two methods available for reflecting the printing light.

In one example, the printing apparatus may include a plurality of light emitters capable of emitting the printing light. The light emitters may simultaneously emit printing light, and the printing light may be irradiated to different positions of the concave arc surface 121. In some embodiments, the number of the light emitters may be equal to the number of the pixels included in a pixel row. For example, when a pixel row includes 1280 pixels, the number of the light emitters may also be 1289. In another example, when a pixel row include 1600 pixels, the number of the light emitters may also be 1600.

In some embodiments, a light emitter may be able to emit S printing light beams towards different directions with each printing light beam corresponding a pixel, and accordingly, the light-emitting device 110 may include P/S light emitters, where P is the number of pixels included in a pixel row.

The light emitters may be arranged at equal intervals. That is, the light emitters may be equally spaced. By controlling the emission direction of the printing light, the printing light may be irradiated onto different positions of the reflector.

After being reflected by different positions of the concave arc surface 121, the printing light may be irradiated onto different positions of the light-sensing device 130 such that a pixel row may be printed at a time. According to the present method, the number of the concave arc surfaces 121 may be 1, and the concave arc surface 121 may always remain stationary.

In another example, the printing apparatus may include only a light emitter, and the light emitter may emit only one printing light beam at a time. The light emitter may periodically emit light to generate printing light beams for printing different pixels.

When the light emitter periodically emits light, the light-emitting parameters of the light emitter or the position parameters of the reflector may be adjusted so that the printing light beams sent in different periods may be irradiated onto different positions of the reflector 120. For example, by adjusting the emitting direction of the light emitter, or by rotating the reflector 120, different positions of the reflector may face the light emitter in different periods. In some embodiments, the light-emitting parameters of the printing light, e.g., the irradiation direction, and the position parameters of the reflector 120, e.g., the facing direction, may be simultaneously adjusted to ensure that the printing light can be irradiated onto different positions of the reflector 120 in different periods.

For example, the concave arc surface 121 may be able to rotate by itself. When the transmission direction of the printing light remains unchanged, through the self-rotation of the concave arc surface 121, the printing light beams with the same incident direction may be irradiated onto different positions of the concave arc surface 121. Further, through the different positions of the concave arc surface 121, reflected light beams with different transmission directions may be generated and then irradiated onto different positions of the light-sensing surface 131. In this case, when a pixel row includes m pixels, the light-emitting device 110 may need to run m pixel-printing cycles. Whether the light-emitting device emits light or not during a pixel-printing cycle may be determined by the content to be printed. However, during each pixel-printing cycle, the concave arc surface 121 may move, that is, the concave arc surface 121 may rotate. For example, when the light-emitting device emits printing light, by changing the position facing to the incident direction of the printing light through the self-rotation of the concave surface 121, the printing light beams may be successfully reflected onto the corresponding positions of the light-sensing surface 131 to finish printing the corresponding pixels.

In some embodiments, the number of the concave arc surfaces 121 may be three or more than three. The concave arc surfaces 121 may be connected through an end-to-end manner to form an arc-surface prism column, and the arc-surface prism column may always move in one direction. As such, the movement control of the arc-surface prism column may be simplified. In some other embodiments, the number of the concave arc surfaces may be 1, and after completing the printing a pixel row is finished, the concave arc surface may return to the original position by rotating in a direction opposite to the rotation direction of the concave arc surface when printing the pixel row.

When the arc-surface prism column includes a plurality of concave arc surfaces 121. For example, the number of the concave arc surfaces 121 may be three, four, five, or six. In some embodiments, the arc-surface prism column may include 4 or 6 concave arc surfaces.

In some embodiments, the light-sensing device 130 may include a light-sensing surface, a rotation drum, and a rotation axle. The rotation drum may be able to rotate around the rotation axle, the rotation axle may be fixed, and the light-sensing surface may be distributed on the outer surface of the rotation drum. According to Method one where a plurality of pixels in a pixel row are printed simultaneously at a time, when a plurality of light beams are reflected by the concave arc surface 121 each time, the plurality of light beams may scan through a pixel row of the light-sensing surface 131; during the printing cycle for a next pixel row, the rotation drum may rotate one step, such that the position of the light-sensing surface 131 for printing the next pixel row may be aligned with the position of the reflected light formed by the concave arc surface 121 to print the next pixel row.

In some embodiments, the light-sensing surface 131 may be a planar surface. When printing different pixel rows, a linear actuator of the light-sensing device 130, such as a linear motor, may drive the light-sensing surface 131 to move in a plane, such that the reflected light beams from the concave arc surface 121 may act on different positions of the light-sensing surface 131 during the printing cycles for different rows.

In other embodiments, the light-sensing surface 131 may be a stationary planar surface, while concave arc surface 121 may be able to move linearly. The concave arc surface 121 may move linearly in different rows parallel to the light-sensing surface 131 for printing different rows. Through the movement of the concave arc surface 121, the printing light may be reflected to different positions of the light-sensing surface 131.

In some other embodiments, the light-sensing surface 131 may be a stationary planar surface, i.e., the light-sensing surface 131 may be a stationary planar sensing surface. In addition, the concave arc surface 121 may also be a stationary reflection surface. However, by controlling the emitted light from each pixel row on positions of the concave arc surface 121 in parallel with the sensing surface, the light-emitting device 110 may be able to use positions at different heights of the concave arc surface 121 to reflect light beams to act on pixel row positions with different heights in the sensing plane.

In some embodiments, the concave arc surface 121 may be symmetrical with respect to a center line. In addition, when a pixel row includes 2N+1 pixels where N is an positive integer, the concave arc surface 121 may be an arc surface capable of reflecting the printing light from the center-line position to form a light spot on the light-sensing surface 131 to act on the $(N+1)^{th}$ pixel of the pixel row. Therefore, using different positions of the concave arc surface 121 for reflection, the light spots corresponding to any two adjacent pixels may be uniformly irradiated onto the light-sensing surface 131. When the a pixel row includes 2N pixels where N is an positive integer, the concave arc surface 121 may be an arc surface capable of reflecting the printing light from a first position to form a light spot on the light-sensing surface 131 to act on the $N^{th}$ pixel of the pixel row, and reflecting the printing light from a second position to form a light spot on the light-sensing surface 131 to act on the $(N+1)^{th}$ pixel of the pixel row, wherein a line connecting the first position and the second position along the concave arc surface 121 may pass through the center-line position.

In some embodiments, the concave arc surface 121 may be a symmetrical arc surface with respect to the center line. Furthermore, when printing a pixel row including an odd number of pixels, the center-line position of the concave arc surface 121 may reflect the printing light corresponding to the center pixel. In some embodiments, a bundle of reflected light beams formed by a bundle of printing light beams may be able to print a pixel row on the light-sensing surface 131. Certainly, when the pixel row includes an even number of pixels, the center-line position of the concave arc surface 121 may correspond to the center point of the reflection positions of the two center pixels of the pixel row.

In some embodiments, the concave arc surface 121 may reflect, from different positions, a plurality of printing light beams that are in a same transmission direction or parallel to each other. As such, the printing light beams may be reflected to different positions of the light-sensing surface 131 to finish printing the pixels in a pixel row.

In some embodiments, the arc-surface reflector may include an arc-surface prism column and a rotation device.

The arc-surface prism column may be formed by at least three identical concave arc surfaces 121, and the ends of any two adjacent concave arc surfaces 121 may be connected to each other. Each concave arc surface 121 may reflect the printing light in a row-printing cycle, i.e. a printing cycle for printing a pixel row.

The rotation device may be able to rotate the arc-surface prism column. A rotation round of the arc-surface reflector may correspond to refection for row-printing cycles having a cycle number the same as the number of the concave arc surfaces 121. That is, in each rotation round of the arc-surface rotation device, the number of the printing cycles may be the same as the number of the concave arc surfaces 121 that form the arc-surface prism column. In other words, in the period that the arc-surface rotation device rotates one round, the number of the printed pixel rows may be equal to the number of the concave arc surface 121 included in the arc-surface rotation device.

In some embodiments, as shown in FIG. 2, the arc-surface reflector includes at least three end-to-end connected concave arc surfaces 121. Each concave arc surface may be used for printing a pixel row. After printing a pixel row, the arc-surface prism column may be rotated such that another concave arc surface 121 may face the light-emitting device 110 to start printing the next pixel row.

In some embodiments, the rotation device may include a rotation axle, and a rotating shaft (not shown) located on the periphery of the axis. The arc-surface prism column may be fixed to the rotation axle, and thus when the rotation axle rotates, the arc-surface prism column may also rotate.

In some embodiments, the rotation device may be a motor which is capable of driving the arc-surface prism column to rotate. For example, the motor may be a step motor, and during each pixel-printing cycle, the step motor may drive the arc-surface prism column to rotate a small step. As such, at different moments when printing a pixel row, different positions of the arc-surface prism column may face to the direction of the printing light emitted by the light-emitting device.

Figure 3:
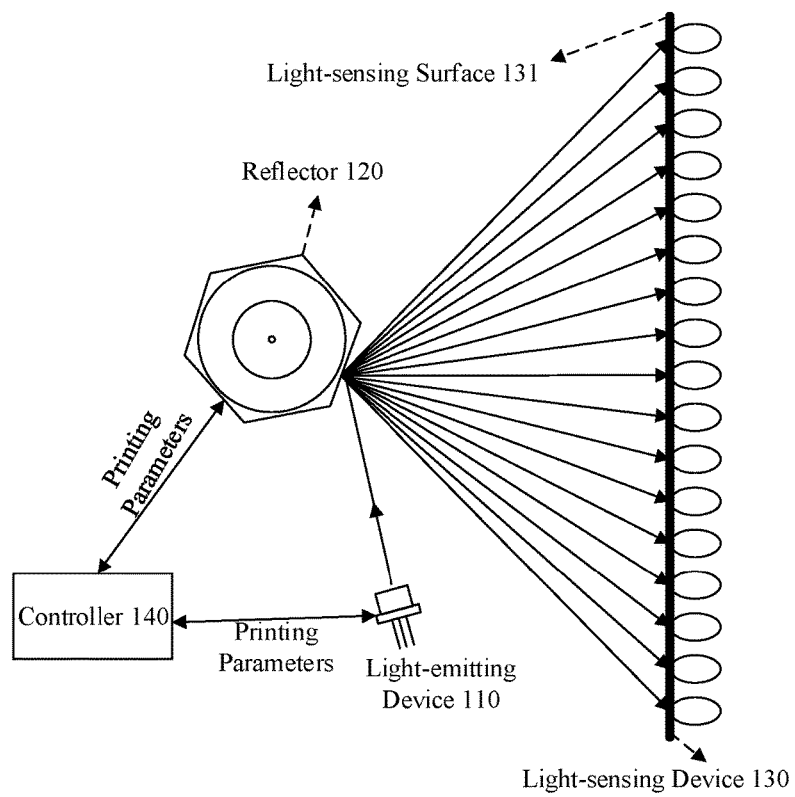
FIG. 3 illustrates a schematic structural view of another printing apparatus consistent with some embodiments of the present disclosure.

In some embodiments, as shown in FIG. 3, the reflector may be a planar-surface reflector including a planar-surface prism column and a rotation device.

The planar-surface prism column may be formed by at least three identical end-to-end connected planar mirrors. The planar mirror may uniformly reflect the light spots that correspond to any two adjacent pixels onto the light-sensing surface using different positions.

The rotation device may rotate the planar-surface prism column. A rotation round of the planar-surface reflector may correspond to refection for row-printing cycles that have a cycle number the same as the number of the planar mirrors. That is, in each rotation round of the planar-surface reflector, the number of the printing cycles may be the same as the number of the planar mirrors that form the planar-surface prism column. In other words, in the period that the arc-surface rotation device rotates one round, the number of the printed pixel rows may be equal to the number of the concave arc surface 121 included in the arc-surface rotation device.

In some embodiments, the printing apparatus may also include a controller 140. When a pixel row includes 2N+1 pixels where N is an positive integer, the controller 140 may generate a printing parameter for printing pixels from the $1^{st}$ pixel to the $(N+1)^{th}$ pixel with a first change tendency and printing pixels from the $(N+1)^{th}$ pixel to the $(2N+1)^{th}$ pixel with a second change tendency. When a pixel row includes 2N pixels where N is an positive integer, the controller 140 may generate a printing parameter for printing pixels from the $1^{st}$ pixel to the $N^{th}$ pixel with a first change tendency and printing pixels from the $(N+1)^{th}$ pixel to the $(2N)^{th}$ pixel with a second change tendency.

The printing parameter may be used to control the operation of the light-emitting device and the planar-surface reflector; N may be a positive integer; and the first change tendency and the second change tendency may be opposite to each other.

In some embodiments, the planar-surface prism column may include at least three end-to-end connected planar mirrors. The rotation device may drive the planar-surface prism column. For example, the number of the planar mirrors included in the planar-surface prism column may be 3, 4, 5, or 6. In some embodiments, the planar-surface prism column may include 4 or 6 planar mirrors.

In some embodiments, each planar mirror of the planar-surface prism column may be used to generate the reflected light corresponding to one pixel row.

In some other embodiments, the printing apparatus may also include a controller, and the type of the controller may have various selections. For example, the controller may be a central processing unit, a microprocessor, a digital signal processor, an application processor, a programmable array, or any other appropriate type of controller. Alternatively, the controller may be an application-specific integrated circuit or any appropriate integrated circuit.

The controller may generate a printing parameter according to the printing needs, i.e. the contents to be printed. In some embodiments, the printing parameter may be a control parameter for controlling the operation status of the light-emitting device 110 and/or the reflector 120.

In addition, regardless of whether an even number or an odd number of pixels included in the pixel row, the printing parameter may always change from the first change tendency to the second change tendency. The first change tendency may be opposite to the second change tendency. For example, the printing parameter may be the rotation speed of the arc-surface prism column or the planar-surface prism column. In some embodiments, the first change tendency may be the rotation speed of the prism column changing from fast to slow, and the second change tendency may be the rotation speed of the prism changing from slow to fast. The switching point between the first change tendency and the second change tendency may be determined by the number of the pixels included in the pixel row is an odd number or an even number: when the number is an odd number, the switching point may be at the $(N+1)^{th}$ pixel of the pixel row; when the number is an even number, the switching point may be at an intermediate time between printing the $N^{th}$ pixel and printing the $(N+1)^{th}$ pixel.

In some embodiments, the printing parameter may be the light-emitting time sequence of the printing light. The first change tendency may include a change from short to long for the light-emitting period of the light-emitting time sequence; and the second change tendency may include a change from long to short for the light-emitting period of the light-emitting time sequence.

Figure 4:
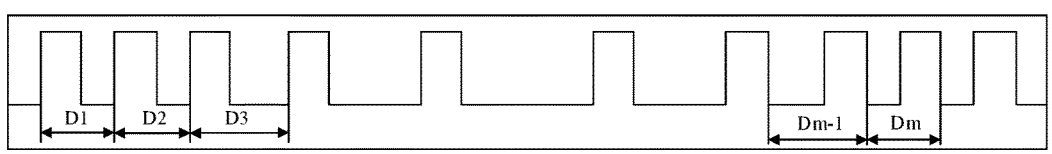
FIG. 4 illustrates a schematic printing time sequence of a printing method consistent with some embodiments of the present disclosure.
Figure 5:
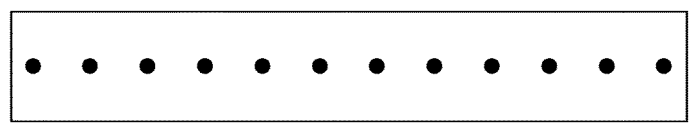
FIG. 5 illustrates a schematic view of a distribution of light spots formed on a light-sensing surface consistent with some embodiments of the present disclosure.

FIG. 4 illustrates a schematic printing time sequence of a printing method consistent with some embodiments of the present disclosure. FIG. 5 illustrates a schematic view of a distribution of light spots formed on a light-sensing surface consistent with some embodiments of the present disclosure. In some embodiments, a period of the light-emitting device is denoted as D, and as shown in FIG. 4, the light-emitting period may gradually become longer, e.g., as shown, D1 is shorter than D2, and D2 is shorter than D3. When passing through the switching point in the center, the light-emitting period may gradually become shorter such that Dm−1 is larger than Dm. Therefore, the light spots printed on the light-sensing surface 131 may be distributed uniformly as shown in FIG. 5.

In some embodiments, the printing parameter may be the rotation angular speed. The first change tendency may include a change from slow to fast for the rotation angular speed; and the second change tendency may include a change from fast to slow for the rotation angular speed.

In some embodiments, the printing parameter is the rotation angular speed, and any two adjacent pixel-printing cycles may be equal to each other. When the rotation angular speed becomes from slow to fast, the angle that the planar-surface prism column rotates in a pixel-printing cycle may change from small to large first, and then from large to small. The variation may be repeated to ensure a uniform distribution or an equal spacing distribution for the plurality of continuously-distributed light spots irradiated on the light-sensing surface 131.

In some embodiments, by controlling the change tendency of the printing parameters, the use of lenses may be avoided, such that without using any lens to refract the reflected light, the reflected light may still be uniformly irradiated onto the light-sensing surface. As such, the light spots on the light-sensing surface that correspond to any two adjacent pixels may be equally spaced. Therefore, the use of lenses in the printing apparatus may be reduced, and thus the structure of the printing apparatus may be simplified and the hardware cost for the printing apparatus may be reduced, making the printing apparatus thinner.

Figure 6:
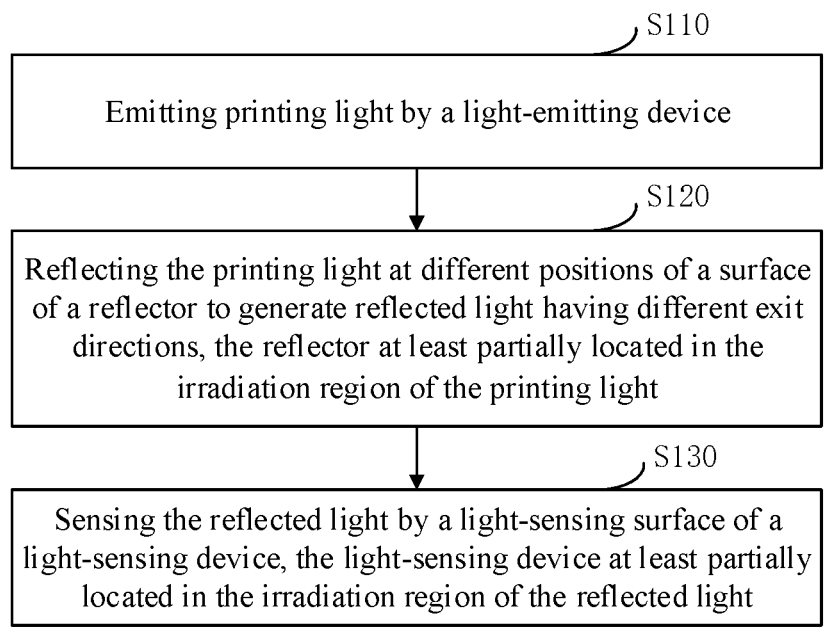
FIG. 6 illustrates a flowchart of a printing method consistent with some embodiments of the present disclosure.

The present disclosure provides a printing method applied to one or more of the disclosed printing apparatuses. FIG. 6 illustrates a flowchart of a printing method consistent with some embodiments of the present disclosure. Referring to FIG. 6, the printing method may include the following steps.

In Step S110, the light-emitting device may emit printing light.

In Step S120, reflected light having different exit directions may be generated by reflecting the printing light from different positions of the reflector, which is at least partially located in the irradiation region of the printing light.

In Step S130, the reflected light may be directly sensed by a light-sensing surface of the light-sensing device to generate a plurality of continuously-distributed light spots on the light-sensing surface with any adjacent light spots equally spaced apart. The light-sensing device is at least partially located in the irradiation region of the reflected light.

In some embodiments, the disclosed printing method may be applied to a printing apparatus that does not include any refracting prism that can change the transmission direction of the emitted light, such as lens.

The light-emitting device 110 may emit printing light. In some embodiments, the printing light may be laser.

In Step S120, the irradiation region of the printing light may be the region that the printing light may pass through when the transmission direction is not changed. Therefore, the printing light may be irradiated to the reflector. In some embodiments, the reflection device may use different positions to face the printing light such that after being reflected, the printing light may be accurately correlated to the light-sensing surface of the light-sensing device. Therefore, the plurality of continuously-distributed light spots may uniformly act on the light-sensing surface so that the plurality of pixels may be uniformly distributed on the light-sensing surface, and thus printing distortion may be avoided.

In some embodiments, the printing apparatus may also include a controller. When a pixel row includes 2N+1 pixels where N is an positive integer, the method may also include generating, by the controller of the printing apparatus, a printing parameter having a first change tendency for printing pixels from the $1^{st}$ pixel to the $(N+1)^{th}$ pixel and having a second change tendency for printing pixels from the $(N+1)^{th}$ pixel to the $(2N+1)^{th}$ pixel. When a pixel row includes 2N pixels where N is an positive integer, the method may also include generating, by the controller of the printing apparatus, a printing parameter having a first change tendency for printing pixels from the $1^{st}$ pixel to the $N^{th}$ pixel and having a second change tendency for printing pixels from the $(N+1)^{th}$ pixel to the $(2N)^{th}$ pixel.

The printing parameter may be used to control the operation of the light-emitting device and the planar-surface reflector; N may be a positive integer; and the first change tendency may be opposite to the second change tendency.

In some embodiments, when the printing parameter is a printing time sequence (i.e., a light-emitting time sequence), Step S110 may include emitting the printing light by the light-emitting device according to the light-emitting time sequence of the printing parameter.

In some other embodiments, when the printing parameter is a rotation angular speed, Step S110 may include controlling the self-rotation of the planar-surface reflector according to the rotation angular speed of the printing parameter to uniformly reflect the light spots corresponding to two adjacent pixels onto the light-sensing surface.

In some embodiments, the printing parameter may also include rotation intervals of the planar-surface reflector. For example, the angular speed may be a constant when the planar-surface reflector rotates, and the rotation intervals may correspond to the rotation durations of two rotations that correspond to two pixels, respectively.

In some embodiments, the first change tendency and the second change tendency may be opposite to each other. When the printing parameter is the printing time sequence (i.e., the light-emitting time sequence), the first change tendency may include a change from short to long for the light-emitting period of the light-emitting time sequence; and the second change tendency may include a change from long to short for the light-emitting period of the light-emitting time sequence.

When the printing parameter is the rotation angular speed, the first change tendency may include a change from slow to fast for the rotation angular speed changing; and the second change tendency may include a change from fast to slow for the rotation angular speed changing.

The present disclosure also provides a computer storage medium. The computer storage medium may store a computer program. After the computer program is executed by a processor or a processing circuit, one or more printing methods provided by the technical schemes described above may be achieved.

The computer storage medium may be any medium capable of storing program codes such as a removable storage device, a read-only memory (ROM), a random access memory (RAM), a magnetic disk, or an optical disk.

The computer storage medium may be a non-transitory storage medium.

From the embodiments provided in the present disclosure, it should be understood that the disclosed apparatuses and methods may be implemented in other manners. The embodiments described above are merely exemplary. For example, the unit division is merely logical function division and may be other division in actual implementation. For example, multiple units or components may be combined or integrated into another system, or some features may be ignored or may not be executed. Additionally, the connections, direct couplings, or communication couplings between the various components illustrated or discussed in the present disclosure may be indirectly coupled or communicatively coupled through some interfaces, devices, or units using electrical, mechanical or any other appropriate methods.

The units described above as separate components may or may not be physically separated. The components displayed as units may or may not be physical units, that is, the components may be located in one place or may be distributed to multiple network units. In practice, some or all of the units may be selected according to the actual needs to achieve the objectives of the schemes described in the embodiments of the present disclosure.

In addition, the functional units in the embodiments of the present disclosure may all be integrated in one processing module. Alternatively, each unit may be used as a single unit, or two or more units may be integrated into one unit. The above integrated units may either be implemented in the form of hardware or in the form of hardware together with software functional units.

Persons of ordinary skill in the art should understand that, all or a part of the steps of the embodiments for implementing the above methods may be implemented by hardware related to instructions of a program. The program may be stored in a non-transitory computer-readable storage medium, and when the program is executed, the steps for implementing the methods described above may be performed.

The above descriptions are merely specific embodiments of the present disclosure, and are not intended to limit the protection scope of the present disclosure. Any changes and substitutions that those skilled in the art can easily conceive within the technical scope of the present disclosure should be covered by the protection scope of the present disclosure. Therefore, the protection scope of the present disclosure should be subject to the protection scope of the claims.

What is claimed is:

1. An apparatus, comprising:
   a light-emitting device, wherein the light-emitting device emits printing light;
   a light-sensing device including a light-sensing surface;
   an arc-surface reflector having one or more concave arc surfaces, wherein:
      the arc-surface reflector is at least partially located in an irradiation region of the printing light to reflect the printing light at different positions to generate reflected light having different exit directions; and
      the reflected light is directly reflected onto the light-sensing surface of the light-sensing device without being refracted by an intermediate optical component to generate a plurality of continuously-distributed light spots on the light-sensing surface with any adjacent light spots equally spaced apart; and
   a rotation device, driving the arc-surface reflector to rotate, wherein, a rotation round of the arc-surface reflector corresponds to reflection in row-printing cycles that have a cycle number same as a number of the concave arc surfaces in the arc-surface reflector.

2. The apparatus according to claim 1, wherein:
   the concave arc surface is symmetrical with respect to a center line;
   for a pixel row including 2N+1 pixels where N is an positive integer, the concave arc surface reflects the printing light from a position at the center line to form a light spot on the light-sensing surface to act on a (N+1)$^{th}$ pixel of the pixel row, and light spots corresponding to any two adjacent pixels are uniformly irradiated on the light-sensing surface, using different positions of the concave arc surface for reflection; and for a pixel row including 2N pixels where N is an positive integer, the concave arc surface reflects the printing light from a first position to form a light spot on the light-sensing surface to act on a N$^{th}$ pixel of the pixel row, and reflects the printing light from a second position to form a light spot on the light-sensing surface to act on a (N+1)$^{th}$ pixel of the pixel row, wherein a line connecting the first position and the second position along the concave arc surface passes through the center line.

3. The apparatus according to claim 1, wherein the arc-surface reflector includes:
an arc-surface prism column, including at least three identical and end-to-end connected concave arc surfaces, wherein one concave arc surface reflects the printing light for a row-printing cycle.

4. The apparatus according to claim 1, further including:
a controller, wherein the controller controls light emission of the light-emitting device according to an image to be printed.

5. The apparatus according to claim 1, wherein:
the reflector is a planar-surface reflector, including:
a planar-surface prism column, including at least three identical and end-to-end connected planar mirrors, wherein the planar mirror uses different positions to reflect the printing light to different positions of the light-sensing surface; and
a rotation device, driving the planar-surface prism column to rotate, wherein a rotation round of the planar-surface reflector corresponds to reflection in row-printing cycles that have a cycle number same as a number of the planar mirrors in the planar-surface reflector.

6. The apparatus according to claim 5, further including:
a controller, wherein:
for a pixel row including 2N+1 pixels, the controller generates a printing parameter for printing pixels from a 1$^{st}$ pixel to a (N+1)$^{th}$ pixel with a change according to a first change tendency and for printing pixels from a (N+1)$^{th}$ pixel to a (2N+1)$^{th}$ pixel with a change according to a second change tendency, and
for a pixel row including 2N pixels, the controller generates a printing parameter for printing pixels from a 1$^{st}$ pixel to a N$^{th}$ pixel with a change according to a first change tendency and printing pixels from a (N+1)$^{th}$ pixel to a (2N)$^{th}$ pixel with a change according to a second change tendency,
wherein:
the printing parameter controls operations of the light-emitting device and the planar-surface reflector, N is an positive integer, and the first change tendency is opposite to the second change tendency.

7. The apparatus according to claim 6, wherein:
the printing parameter is a light-emitting time sequence of the printing light;
the first change tendency includes a change from short to long for a light-emitting period of the light-emitting time sequence; and
the second change tendency includes a change from long to short for the light-emitting period of the light-emitting time sequence.

8. The apparatus according to claim 6, wherein:
the printing parameter is a rotation angular speed of the planar-surface prism column;
the first change tendency includes a change from slow to fast of the rotation angular speed; and
the second change tendency includes a change from fast to slow of the rotation angular speed.

9. The apparatus according to claim 1, wherein:
the light-sensing device further includes a rotation drum and a rotation axle, wherein the rotation axle is fixed, the light-sensing surface is located on an outer surface of the rotation drum, and the rotation drum rotates around the rotation axle.

10. A method, comprising:
emitting, by a light-emitting device of a printing apparatus, printing light;
reflecting, by a concave arc surface of a reflector of the printing apparatus, the printing light;
changing an emission direction of the printing light to a plurality of directions to cause the printing light being reflected at different positions of the concave arc surface to generate reflected light having different exit directions; and
directly sensing, by a light-sensing surface of a light-sensing device of the printing apparatus, the reflected light without being refracted by an intermediate optical component to generate a plurality of continuously distributed light spots on the light-sensing surface with any adjacent light spots equally spaced apart.

11. The method according to claim 10, further including:
generating, by a controller of the printing apparatus, a printing parameter having a first change tendency for printing pixels from a 1$^{st}$ pixel to a (N+1)$^{th}$ pixel and a second change tendency for printing pixels from a (N+1)$^{th}$ pixel to a (2N+1)$^{th}$ pixel when a pixel row includes 2N+1 pixels, or a printing parameter having a first change tendency for printing pixels from a 1$^{st}$ pixel to a N$^{th}$ pixel and a second change tendency for printing pixels from a (N+1)$^{th}$ pixel to a (2N)$^{th}$ pixel when a pixel row includes 2N pixels, wherein:
the printing parameter controls operations of the light-emitting device and the reflector, N is an positive integer, and the first change tendency is opposite to the second change tendency.

12. The method according to claim 11, wherein:
the light-emitting device emits the printing light according to a light-emitting time sequence of the printing parameter.

13. The method according to claim 10, wherein:
the reflector is a planar-surface reflector, including:
a planar-surface prism column, including at least three identical and end-to-end connected planar mirrors, and
a rotation device, driving the planar-surface prism column to rotate; and
the planar-surface reflector controls a self-rotation angular speed to uniformly reflect light spots corresponding to two adjacent pixels onto the light-sensing surface.

14. The method according to claim 11, wherein:
the printing parameter is a light-emitting time sequence of the printing light;
the first change tendency includes a change from short to long for a light-emitting period of the light-emitting time sequence; and
the second change tendency includes a change from long to short for the light-emitting period of the light-emitting time sequence.

15. The method according to claim 11, wherein:
the reflector is a planar-surface reflector, including:
a planar-surface prism column, including at least three identical and end-to-end connected planar mirrors, and a rotation device, driving the planar-surface prism column to rotate;

the printing parameter is a rotation angular speed of the planar-surface prism column;

the first change tendency includes a change from slow to fast of the rotation angular speed; and the second change tendency includes a change from fast to slow of the rotation angular speed.

16. A method, comprising:

emitting, by a light-emitting device of a printing apparatus, printing light;

reflecting, by a concave arc surface of a reflector of the printing apparatus, the printing light at different positions of the concave arc surface to generate reflected light having different exit directions;

driving the reflector to rotate, wherein a rotation round of the reflector corresponds to row-printing cycles that have a cycle number same as a number of concave arc surfaces in the reflector; and directly sensing, by a light-sensing surface of a light-sensing device of the printing apparatus, the reflected light without being refracted by an intermediate optical component to generate a plurality of continuously-distributed light spots on the light-sensing surface with any adjacent light spots equally spaced apart.

* * * * *